US008492979B2

(12) United States Patent
Ganireddy et al.

(10) Patent No.: US 8,492,979 B2
(45) Date of Patent: Jul. 23, 2013

(54) PLASMA GENERATION APPARATUS

(75) Inventors: Govardhan Ganireddy, Bangalore (IN); Thangavelu Asokan, Bangalore (IN); Adnan Kutubuddin Bohori, Bangalore (IN)

(73) Assignee: General Electric Company, Niskayuna, NY (US)

( * ) Notice: Subject to any disclaimer, the term of this patent is extended or adjusted under 35 U.S.C. 154(b) by 618 days.

(21) Appl. No.: 12/731,700

(22) Filed: Mar. 25, 2010

(65) Prior Publication Data

US 2011/0234099 A1 Sep. 29, 2011

(51) Int. Cl.
*H05B 31/26* (2006.01)
*B23K 9/00* (2006.01)

(52) U.S. Cl.
USPC ............. 315/111.21; 219/121.56; 219/121.57

(58) Field of Classification Search
USPC .................... 315/111.01–111.91, 5, 5.14, 38, 315/50, 58–59, 71, 160; 219/119, 121.34, 219/121.36, 121.48, 121.52, 121.56, 121.57
See application file for complete search history.

(56) References Cited

U.S. PATENT DOCUMENTS 3,949,266 A 4/1976 Vogt et al.
4,982,067 A * 1/1991 Marantz et al. .......... 219/121.47
5,227,603 A * 7/1993 Doolette et al. ......... 219/121.59
5,357,075 A * 10/1994 Muehlberger ........... 219/121.47
6,662,793 B1 * 12/2003 Allen et al. ................... 123/620
7,411,353 B1 * 8/2008 Rutberg et al. .......... 315/111.21
7,821,749 B2 10/2010 Asokan et al.
7,929,260 B2 4/2011 Roscoe et al.
7,986,505 B2 7/2011 Roscoe et al.
8,053,699 B2 11/2011 Roscoe et al.
8,253,057 B1 * 8/2012 Hunt ........................ 219/121.36
2008/0239592 A1 10/2008 Roscoe et al.
2008/0253040 A1 10/2008 Asokan et al.
2008/0283153 A1 * 11/2008 Zurecki et al. ................ 148/217
2009/0134129 A1 5/2009 Robarge et al.
2009/0308845 A1 12/2009 Bohori et al.
2010/0301021 A1 12/2010 Bohori et al.

FOREIGN PATENT DOCUMENTS

EP 2031727 A2 3/2009
EP 2066154 A2 6/2009
GB 1476531 A 6/1977

OTHER PUBLICATIONS

Search Report and Written Opinion from corresponding EP Application No. 11159260.6-1226 dated Nov. 9, 2011.

* cited by examiner

*Primary Examiner* — Jimmy Vu
*Assistant Examiner* — Henry Luong
(74) *Attorney, Agent, or Firm* — Jason K. Klindtworth

(57) ABSTRACT

Provided is an apparatus, such as an arc mitigating device, which can include a first plasma generation device and a second plasma generation device. The second plasma generation device can include a pair of opposing and spaced apart electrodes and a low voltage, high current energy source connected therebetween. A conduit can be configured to direct plasma between the first and second plasma generation devices, such that the second plasma generation device receives plasma generated by the first plasma generation. The plasma from the first plasma generation device can act to reduce the impedance of an area between the pair of opposing electrodes sufficiently to allow an arc to be established therebetween due to the low voltage, high current energy source.

14 Claims, 12 Drawing Sheets

PLASMA GENERATION APPARATUS

BACKGROUND

Embodiments of the present invention generally relate to plasma guns, and more particularly to ablative plasma guns.

Electric power circuits and switchgear typically involve conductors separated by insulation. Air space often serves as part or all of this insulation in some areas. If the conductors are too close to each other or the voltage difference exceeds the insulation properties, an arc can occur between the conductors. Air or any insulation (gas or solid dielectrics) between the conductors can become ionized, making the insulation conductive and thereby enabling arcing. Arc temperatures can reach as high as 20,000° C., vaporizing conductors and adjacent materials, and releasing an explosive energy that can destroy circuits.

Arc flash is the result of a rapid energy release due to an arcing fault between phase-phase, phase-neutral, or phase-ground. An arc flash can produce high heat, intense light, pressure waves, and sound/shock waves similar to that of an explosion. However, the arc fault current is usually much less in magnitude as compared to short circuit current, and hence delayed or no tripping of circuit breakers is expected unless the breakers are selected to handle an arc fault condition. Typically, arc flash mitigation techniques use standard fuses and circuit breakers. However, such techniques have slow response times and may not be fast enough to mitigate an arc flash.

One other technique that has been used to mitigate arc fault is to employ a shorting (mechanical crowbar) switch, placed between the power bus and ground, or between phases. Upon occurrence of an arc fault, the crowbar switch shorts the line voltage on the power bus and diverts the energy away from the arc flash, thus protecting equipment from damage due to arc blasts. The resulting short on the power bus causes an upstream circuit breaker to clear the bolted fault. Such switches, which are large and costly, are located on the main power bus causing the bolted fault condition when triggered. As a result, the mechanical crowbars are known to cause extreme stress on upstream transformers.

There is a need for improved arc flash prevention mechanism that has an improved response time and that is cost effective.

BRIEF DESCRIPTION

In one aspect, an apparatus, such as an arc mitigating device, is provided. The arc mitigating device can include first and second plasma generation devices, and in some cases a third plasma generation device. The plasma generation devices can be configured to emit plasma generated therein so as to provide a plasma bridge between main electrodes that are separated by at least about 50 mm. For example, the arc mitigating device can include the main electrodes.

The second plasma generation device can include a pair of opposing and spaced apart electrodes. A low voltage, high current energy source can be connected between the opposing electrodes. A conduit can be configured so as to direct plasma between the first plasma generation device and other plasma generation devices. The second plasma generation device can be configured, for example, to receive plasma generated by the first plasma generation device so as to reduce the impedance of an area between the opposing electrodes of the second plasma generation device. For example, the impedance can be reduced sufficiently to allow an arc to be established between the opposing electrodes of the second plasma generation device due to the low voltage, high current energy source. The second plasma generation device can include an ablative material configured to be ablated when an arc exists between the pair of opposing electrodes.

The first plasma generation device can include a first electrode, a base electrode that is spaced apart from the first electrode, and a high voltage, low current energy source configured to generate a potential difference between the first electrode and the base electrode sufficient to cause breakdown of air therebetween (say, of at least about 8 kV at a current less than or equal to about 1 A). The first plasma generation device can also include a second electrode that opposes and is spaced apart from the base electrode. A low voltage, high current energy source (say, configured to produce a voltage less than or equal to about 1 kV and a current of at least about 4 kA) can be connected between the second electrode and the base electrode, where the second and base electrodes are disposed so as to induce breakdown of air therebetween when an arc exists between the first and base electrodes. The first plasma generation device can further include an ablative material configured to be ablated when an arc exists between the second and base electrodes.

In some embodiments, the low voltage, high current energy source can be connected between the first and base electrodes in parallel with the high voltage, low current energy source. The high voltage, low current energy source can be configured to provide a high voltage, low current pulse across the first and base electrodes, and the low voltage, high current energy source can be configured to provide a low voltage, high current pulse across the first and base electrodes in response to the high voltage, low current pulse.

In another aspect, an apparatus, such as an arc mitigating device, is provided. The arc mitigating device can include a first plasma generation device and a second plasma generation device. The second plasma generation device can include a pair of opposing and spaced apart electrodes and a low voltage, high current energy source connected therebetween. A conduit can be configured to direct plasma between the first and second plasma generation devices, such that the second plasma generation device receives plasma generated by the first plasma generation. The plasma from the first plasma generation device can act to reduce the impedance of an area between the pair of opposing electrodes sufficiently to allow an arc to be established therebetween due to the low voltage, high current energy source.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
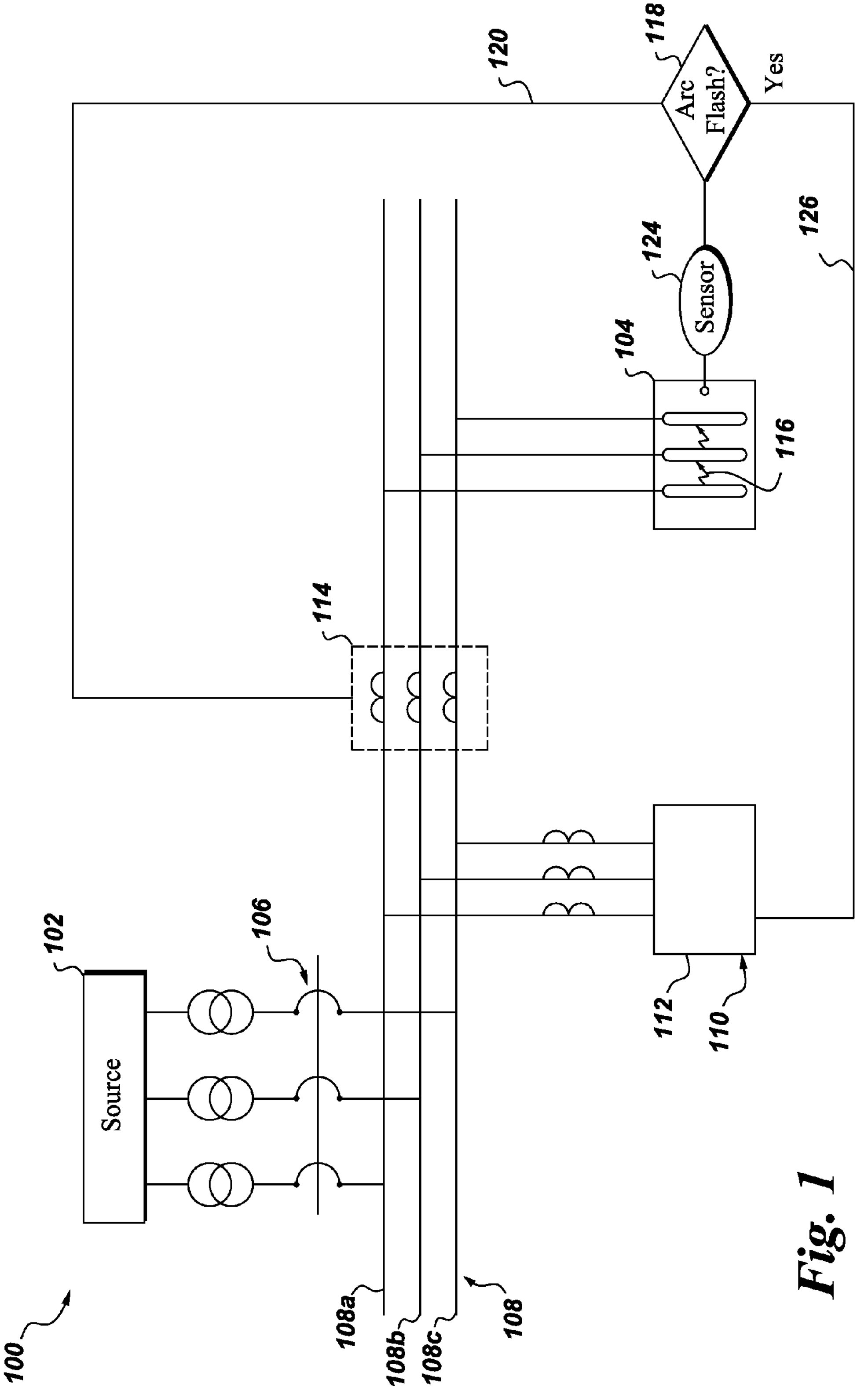
FIG. 1 is a schematic view of an electrical power system configured in accordance with an example embodiment.

Example embodiments of the present invention are described below in detail with reference to the accompanying drawings, where the same reference numerals denote the same parts throughout the drawings. Some of these embodiments may address the above and other needs.

Referring to FIG. 1, an electrical power system is illustrated and designated generally by the reference numeral 100. The electrical power system 100 includes a power source 102 configured to deliver power to a load 104 via a circuit breaker 106. For example, the power source 102 can deliver alternating current (AC) power to a common bus 108 using a three-phase configuration, as shown, or, for example, via a single phase configuration. The power source 102 and the load 104 can also be coupled, via the common bus 108, to an arc mitigating device 110. The arc mitigating device 110 can be enclosed within an arc containment device 112.

An electrical signal monitoring system 114 can be configured to monitor current variations in the electrical power system 100 that may arise due to an arc flash event 116. In one example, the electrical signal monitoring system 114 includes a current transformer. An arc flash decision system 118 can be configured to receive electrical parameters 120 from the electrical signal monitoring system 114 and parameters 122 from an arc flash sensor 124. As used herein, the term 'parameters' refers to quantities that may act as indicia of arc flash events such as, for example, optical light, thermal radiation, acoustic, pressure, and/or radio frequency signals originating from an arc flash event 116. Accordingly, the sensor 124 can include, for example, an optical sensor, a thermal radiation sensor, an acoustic sensor, a pressure transducer, and/or radio frequency sensor. Based on the parameters 120 and 122, the arc flash decision system 118 can generate an arc fault signal 126 indicating the occurrence of the arc flash event 116. As discussed below, the arc fault signal 126 may serve to activate the arc mitigating device 110.

Figure 2:
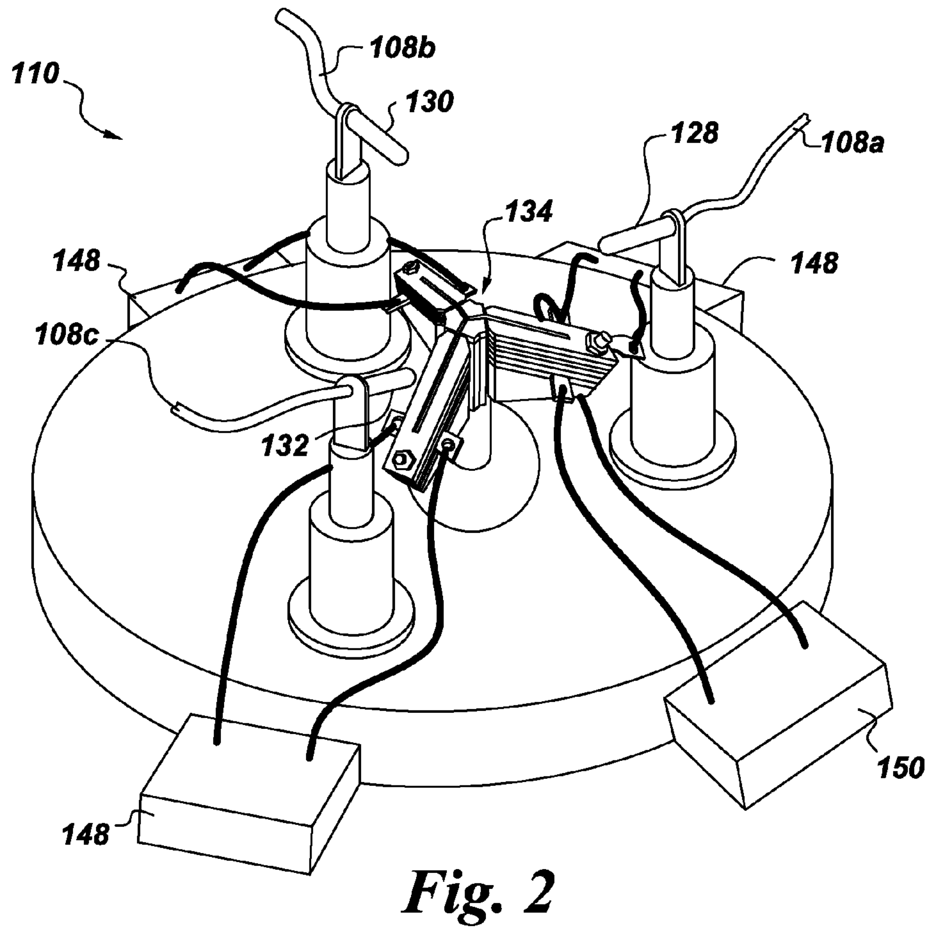
FIG. 2 is a perspective view of the arc mitigating device of FIG. 1.
Figure 3:
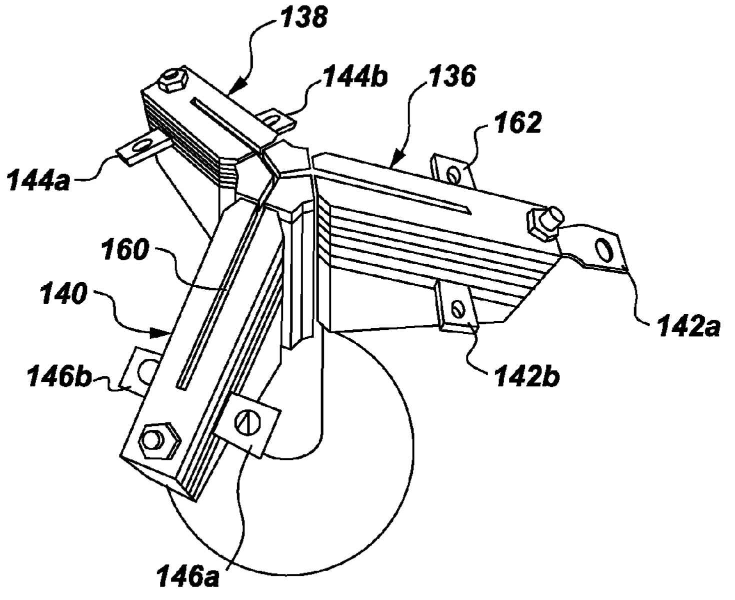
FIG. 3 is a perspective view of the plasma generation system of FIG. 2.
Figure 4:
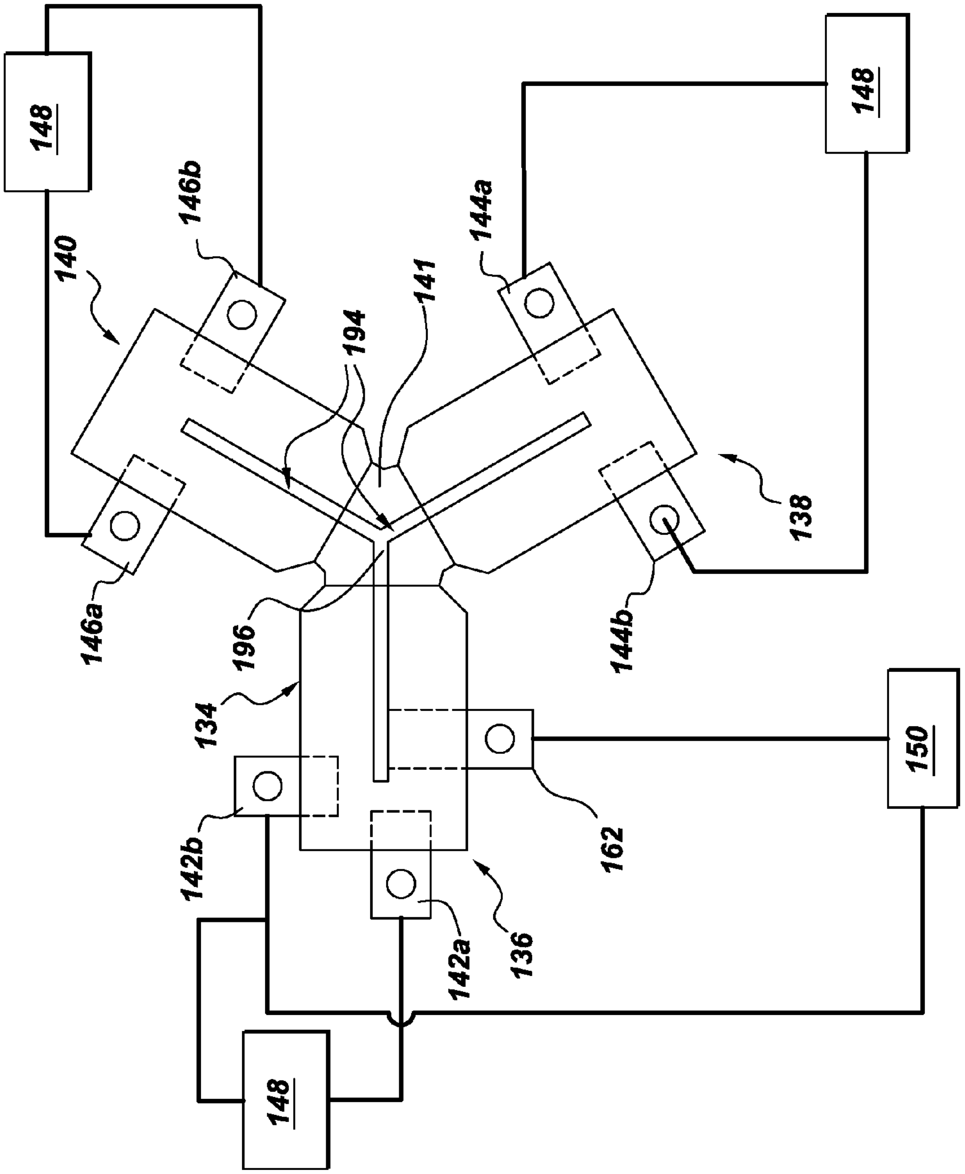
FIG. 4 is a plan view of the plasma generation system of FIG. 2.
Figure 5:
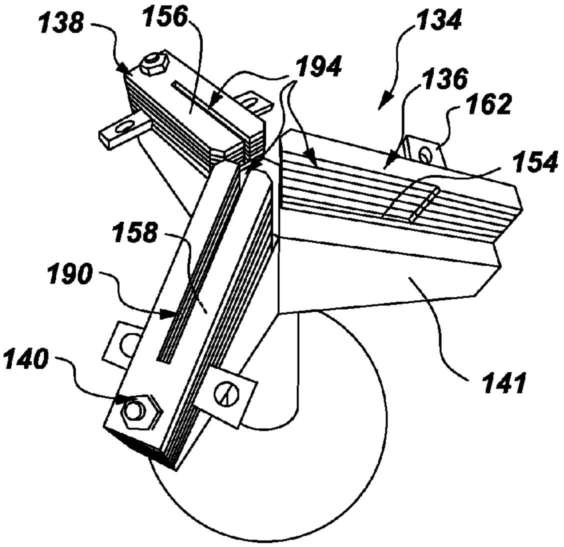
FIG. 5 is a perspective, fragmentary view of the plasma generation system of FIG. 2.
Figure 6:
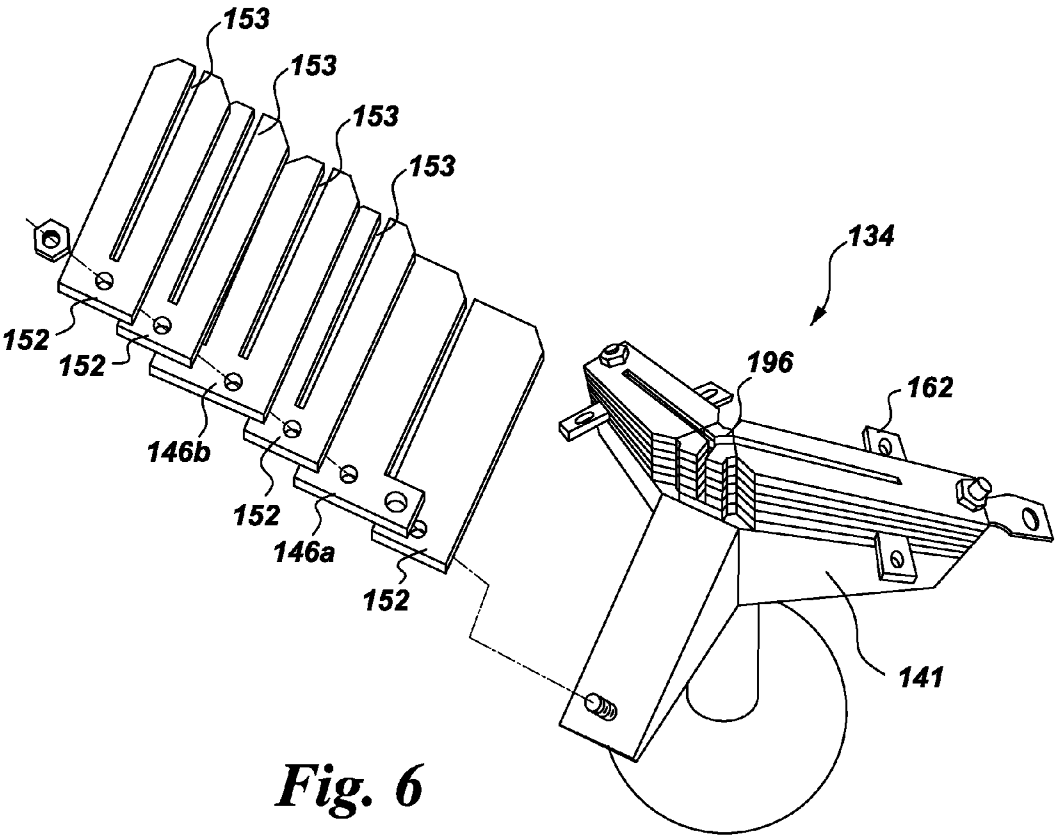
FIG. 6 is a perspective, partially-exploded view of the plasma generation system of FIG. 2.
Figure 7:
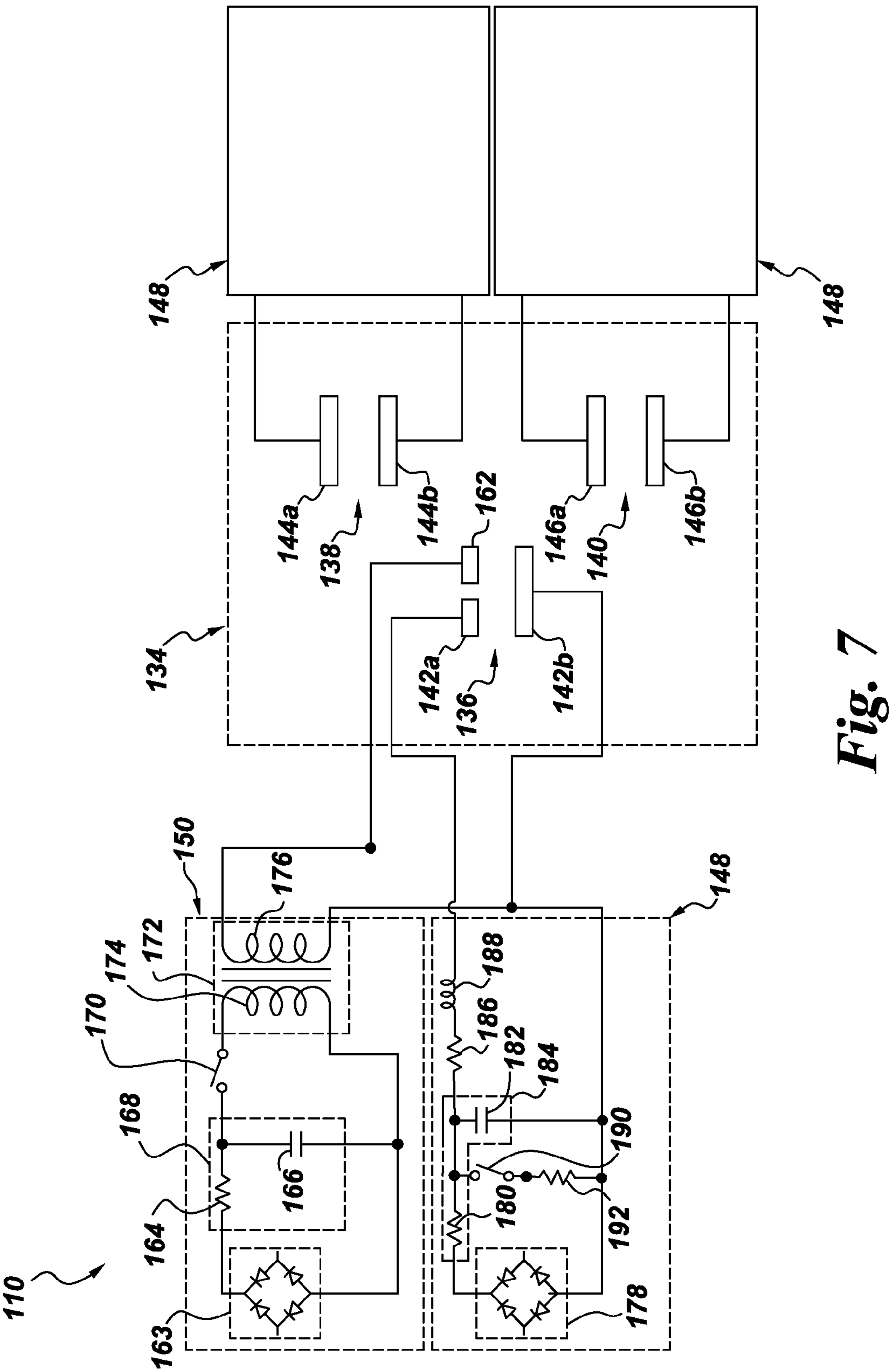
FIG. 7 is a circuit diagram of the plasma generation system of FIG. 2.
Figure 8:
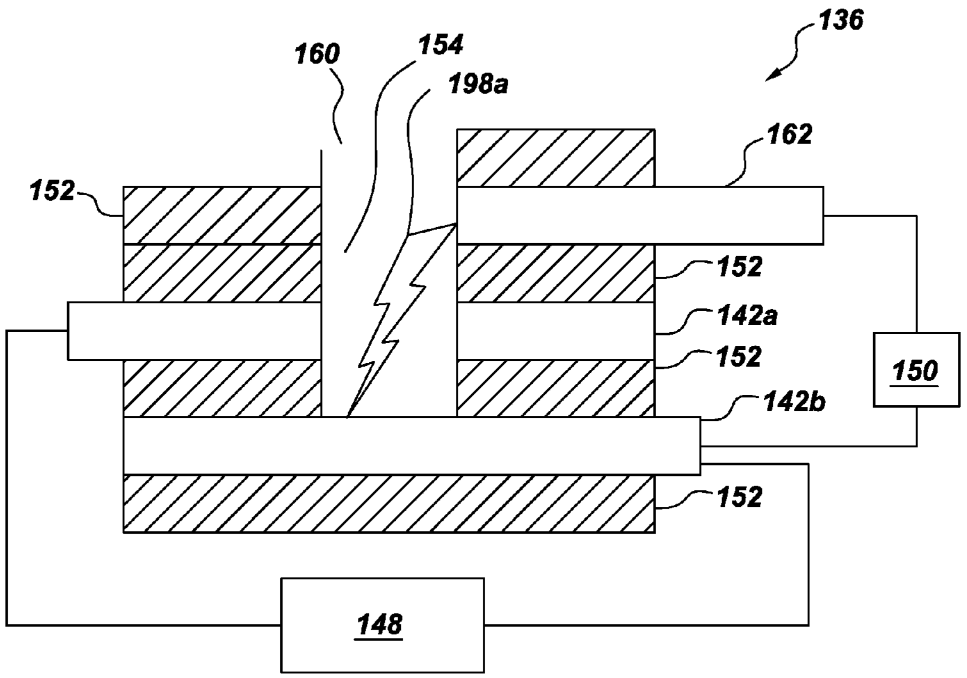
FIG. 8 is a schematic, cross-sectional view of a plasma gun of the plasma generation system of FIG. 2 depicting the formation of an arc between the first and base electrodes of one plasma gun.
Figure 10:
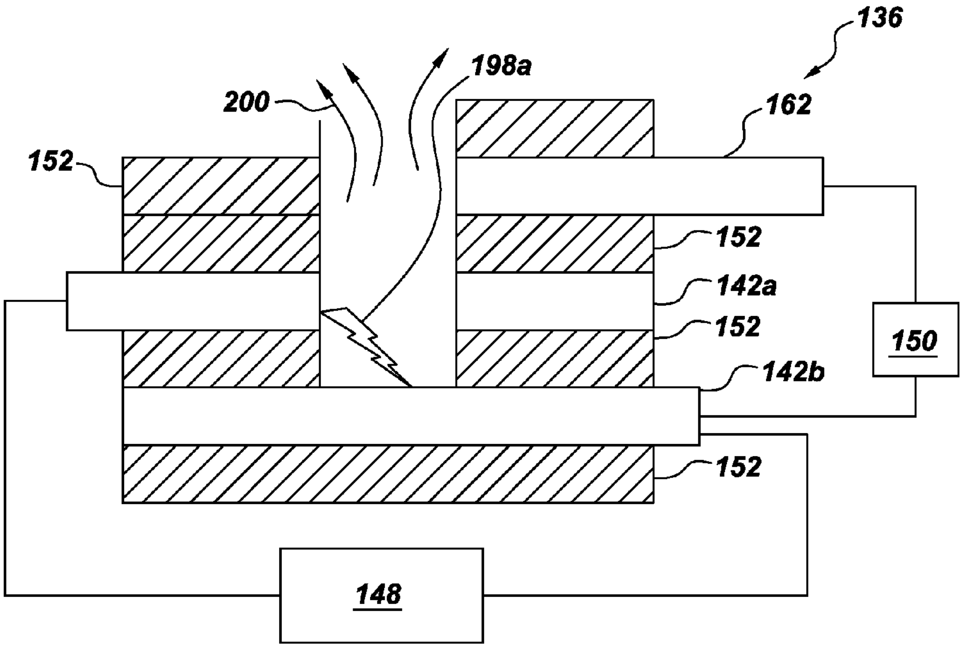
FIG. 10 is a schematic, cross-sectional view of a plasma gun of the plasma generation system of FIG. 2 showing the formation of an arc between the second and base electrodes of the plasma gun.
Figure 9:
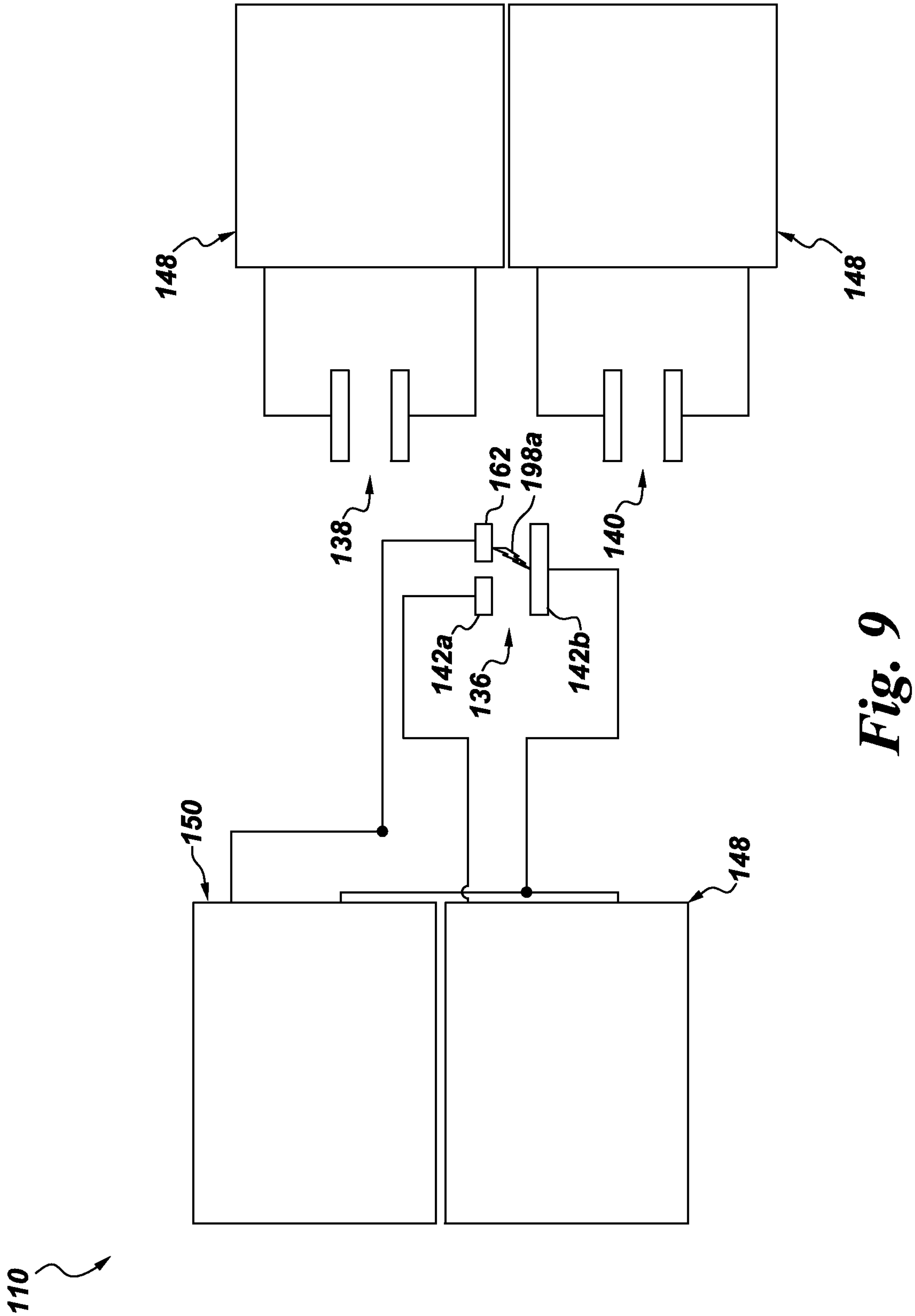
FIG. 9 is a circuit diagram of the plasma generation system of FIG. 2 depicting the formation of an arc between the first and base electrodes of one plasma gun.
Figure 11:
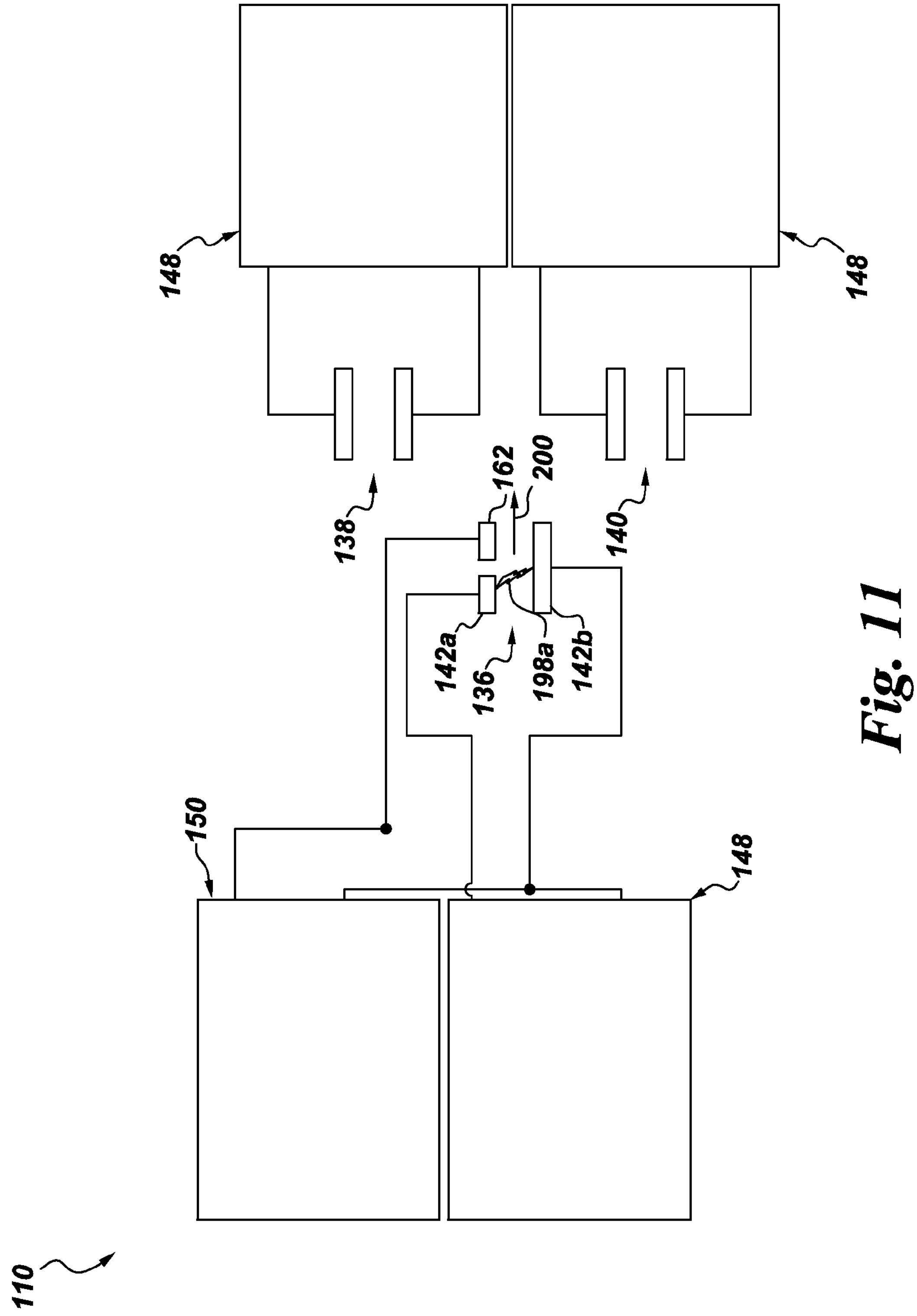
FIG. 11 is a circuit diagram of the plasma generation system of FIG. 2 showing the formation of an arc between the second and base electrodes of the plasma gun.

Referring to FIGS. 1 and 2, the arc mitigating device 110 can include main electrodes 128, 130, 132 respectively connected to the conductors 108*a*, 108*b*, 108*c* of the common bus 108 (the different conductors corresponding, for example, to different phases, neutral, or ground). While this embodiment shows three main electrodes, other embodiments may include more or fewer electrodes as required by the electrical power system. Clearance between the main electrodes 128, 130, 132 may be required for normal operation of the electrical power system 100, with the requisite amount of clearance depending on the system voltage. For example, a low voltage system operating at about 600 V may require a clearance of about 25 mm between the main electrodes 128, 130, 132, while a medium voltage system operating at about 15 kV may require the main electrodes to be separated by at least about 50 mm, and in some cases more than 100 mm or even 150 mm.

Referring to FIGS. 1-6, the arc mitigating device 110 can include a plasma generation system 134. The plasma generation system 134 can include one or more plasma generation devices, such as plasma guns 136, 138, 140, that are supported by a housing 141 and disposed between the main electrodes 128, 130, 132. Each of the plasma guns 136, 138, 140 can include a pair of opposing and spaced apart electrodes 142*a* and 142*b*, 144*a* and 144*b*, 146*a* and 146*b*. The electrodes 142*a*, 142*b*, 144*a*, 144*b*, 146*a*, 146*b* can be formed, for example, of copper and/or stainless steel, and may include terminals to facilitate connection of the electrodes to respective energy sources 148, 150 (discussed below).

Each of the plasma guns 136, 138, 140 can also include an ablative material. For example, each of the plasma guns 136, 138, 140 may include dielectric ablative material portions 152 that are respectively disposed proximate to (for example, layered with) the pairs of opposing electrodes 142*a* and 142*b*, 144*a* and 144*b*, 146*a* and 146*b*. As discussed further below, the ablative material portions 152 can be configured such that at least one ablative material portion 152 will be ablated when an arc of sufficient current exists between a corresponding pair of opposing electrodes 142*a* and 142*b*, 144*a* and 144*b*, and/or 146*a* and 146*b*. Candidate ablative materials include, for example, polytetrafluoroethylene, polyoxymethylene polyamide, poly-methyle methacralate (PMMA), and/or other ablative polymers.

Some of the electrodes 142*a*, 142*b*, 144*a*, 144*b*, 146*a*, 146*b* and ablative material portions 152 may define slots 153, such that, when assembled together, the electrodes and ablative material portions together act to define respective chamber areas 154, 156, 158 within each of the plasma guns 136, 138, 140. As will be discussed further below, during operation of the plasma guns 136, 138, 140, ablation and corresponding plasma generation can take place in the chambers 154, 156, 158, which chambers define ports 160 that are open toward the area around the main electrodes 128, 130, 132.

Referring to FIGS. 2-7, a respective low voltage, high current pulse energy source 148 can be connected across each pair of opposing electrodes 142*a* and 142*b*, 144*a* and 144*b*, 146*a* and 146*b*. In this context, "low voltage, high current" pulse energy source refers to an energy source that is configured to produce a voltage less than or equal to about 1 kV and a pulse current of at least about 4 kA. The low voltage, high current pulse energy source 148 can be configured such that, when an arc exists between a corresponding pair of opposing electrodes 142*a* and 142*b*, 144*a* and 144*b*, 146*a* and 146*b*, the current associated with the arc is sufficient to ablate at least one ablative material portion 152. An example of a low voltage, high current pulse energy source 148 is provided below.

One plasma gun (say, plasma gun 136) can include another electrode 162. The electrodes 142*a*, 142*b*, 162 associated with plasma gun 136 are hereinafter referred to, respectively, as the "second" electrode (142*a*), the "base" electrode (142*b*), and the "first" electrode (162). A high voltage, low current pulse energy source 150 can be connected across the first electrode 162 and the base electrode **142*b*, and can be configured to generate an at least transient potential difference sufficient to cause breakdown of air therebetween. In this context, "high voltage, low current" pulse energy source refers to an energy source that is configured to produce a voltage of at least about 8 kV and a pulse current less than or equal to about 1 A. An example of a high voltage, low current pulse energy source 150** is provided below.

The high voltage, low current pulse energy source 150 may be a capacitor discharge circuit or a pulse transformer-based, for example. The high voltage pulse energy source 150 can include a rectifier 163 in power connection with a power source (not shown), a resistor 164 and a capacitor 166 forming a resistive-capacitive charging circuit 168, and a switch 170 disposed in series with the capacitor 166. For example, the high voltage, low current pulse energy source 150 can receive a voltage of approximately 120-480 V AC (120-480 VAC), and the capacitor 166 can charge to a predetermined voltage of approximately 240 V. The high voltage, low current pulse energy source 150 can further include a high voltage pulse transformer 172 having a primary winding 174 and a secondary winding 176. The primary winding 174 can be in power connection with the power source (not shown) through the switch 170 and the secondary winding 176 can be in power connection with the first electrode 162 and the base electrode **142*b***.

The low voltage, high current pulse energy source 148 may be, for example, a capacitive discharge circuit using a microfarad range capacitor that generates relatively high current and relatively low voltages (e.g., approximately 5 kA at a voltage lower than approximately 1 kV). The low voltage, high current pulse energy source 148 can include a rectifier 178 in power connection with a power source (not shown), and a resistor 180 and a capacitor 182 configured as a resistive-capacitive charging circuit 184. For example, the low voltage, high current pulse energy source 148 can receive a voltage of approximately 480 VAC from a power source (not shown), and the capacitor 182 can charge up to approximately 600 V. The capacitor 182 can be in parallel with the pair of electrodes **142*a* and 142*b* and in series with the resistor 180. The low voltage, high current pulse energy source 148 can further include a resistor 186, an inductor 188 connected in series between the rectifier 178 and the second electrode 142*a*. Additionally, a switch 190 and resistor 192 can be connected in series across the rectifier 178 to provide a discharge path during testing of the low voltage, high current pulse energy source 148**.

The plasma generation system 134 can include a conduit 194 configured to allow fluid communication between the plasma guns 136, 138, 140. For example, the electrodes **142*a*, 142*b*, 144*a*, 144*b*, 146*a*, 146*b*, 162 and ablative material portions 152 of each guns 136, 138, 140 can be configured so as to define chambers 154, 156, 158 that integrate with a channel 196 defined by the housing 141**.

Referring to FIGS. 1 and 7-11, in operation, the arc flash decision system 118 can determine the occurrence of an arc flash event 116 (based on the parameters 120 and 122) and generate an arc fault signal 126. The high voltage, low current pulse energy source 150 can be configured to receive the arc fault signal 126 and to generate, in response, a pulse that causes a breakdown of air (or, more generally, whatever gas is present) between the first electrode 162 and the base electrode **142*b*. For example, the arc fault signal 126 may cause the switch 170 to close, with a pulse being sent through the primary winding 174 of the pulse transformer 172. In response, a second voltage potential may be established via the secondary winding 176 of the transformer 172 across the first and base electrodes 162, 142*b*. Thus, a high voltage (e.g., approximately 8 kV when the capacitor 166 is charged to approximately 240 V), low current pulse can be created, which pulse may be high enough to overcome the breakdown voltage of air between the first electrode 162 and the base electrode 142*b*. As a result, an arc 198*a* of relatively low energy may span the distance between the first electrode 162 and the base electrode 142*b***.

The second electrode **142*a* can be disposed such that the arc 198*a* between the first electrode 162 and the base electrode 142*b* causes a decrease in the impedance presented by the space between the second electrode and the base electrode. This decrease in impedance can be sufficient to induce, under the influence of the low voltage, high current pulse energy source 148, breakdown of air between the second and base electrodes 142*a*, 142*b*, thereby allowing the arc 198*a* to move to and be sustained between the second and base electrodes. The decrease in impedance also allows a high current pulse to flow between the second and base electrodes 142*a*, 142*b* despite the low voltage. The energy of the arc 198*a* therefore increases significantly as the capacitor 182 of the low voltage, high current pulse energy source 148** discharges.

Figure 12:
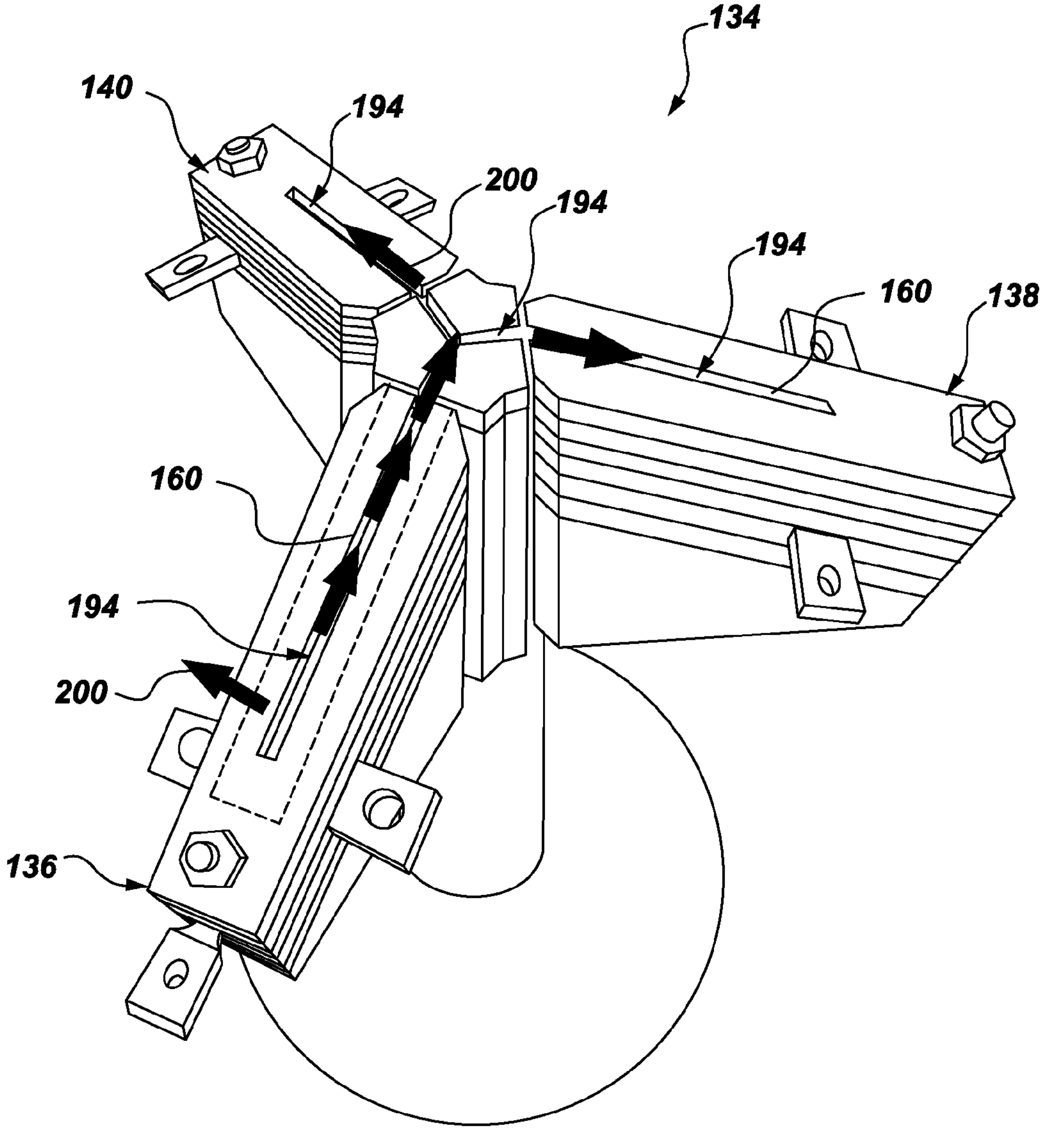
FIG. 12 is a perspective view of the plasma generation system of FIG. 2 depicting the movement of plasma therethrough.
Figure 13:
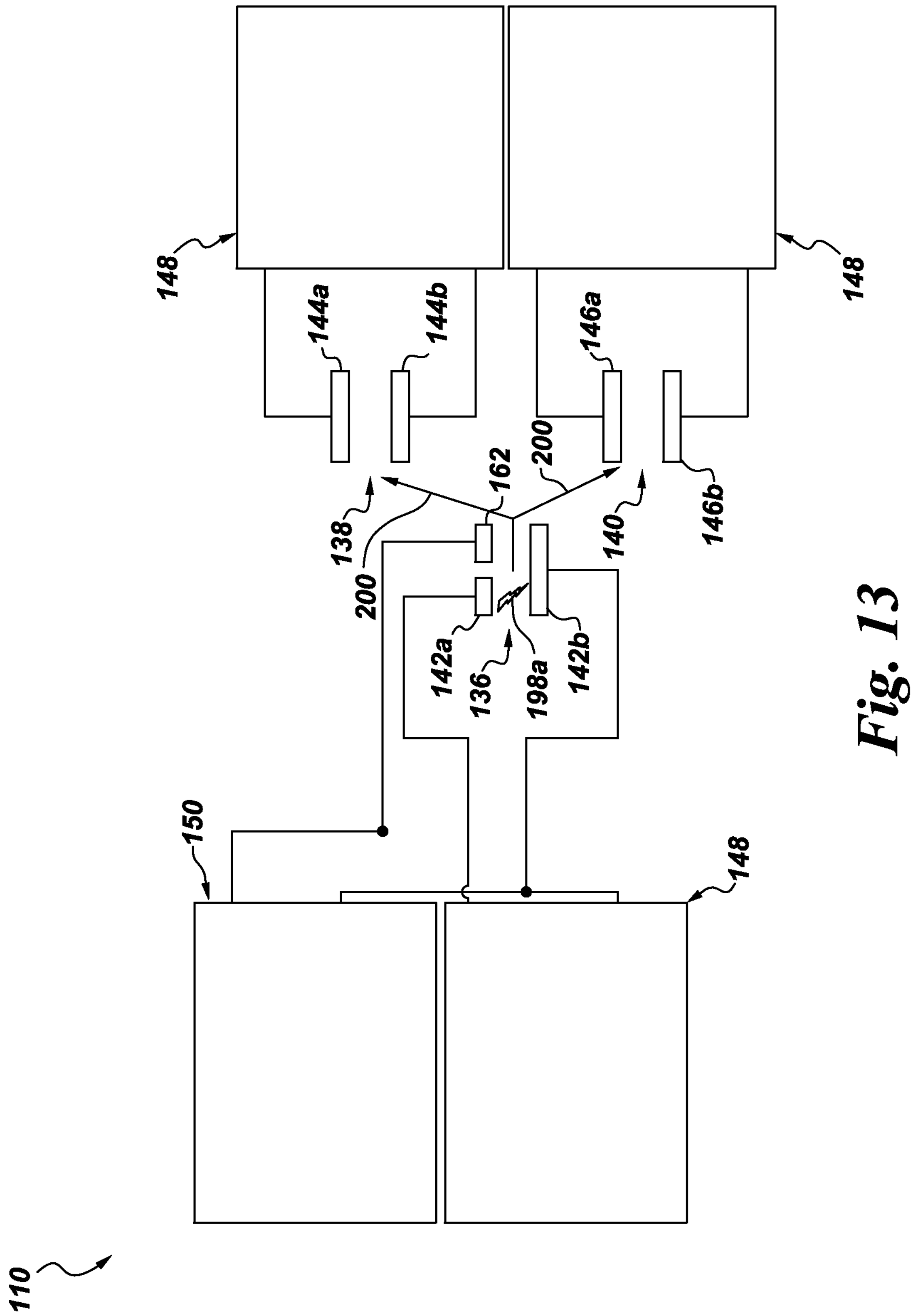
FIG. 13 is a circuit diagram of the plasma generation system of FIG. 2 depicting the movement of plasma therethrough.
Figure 14:
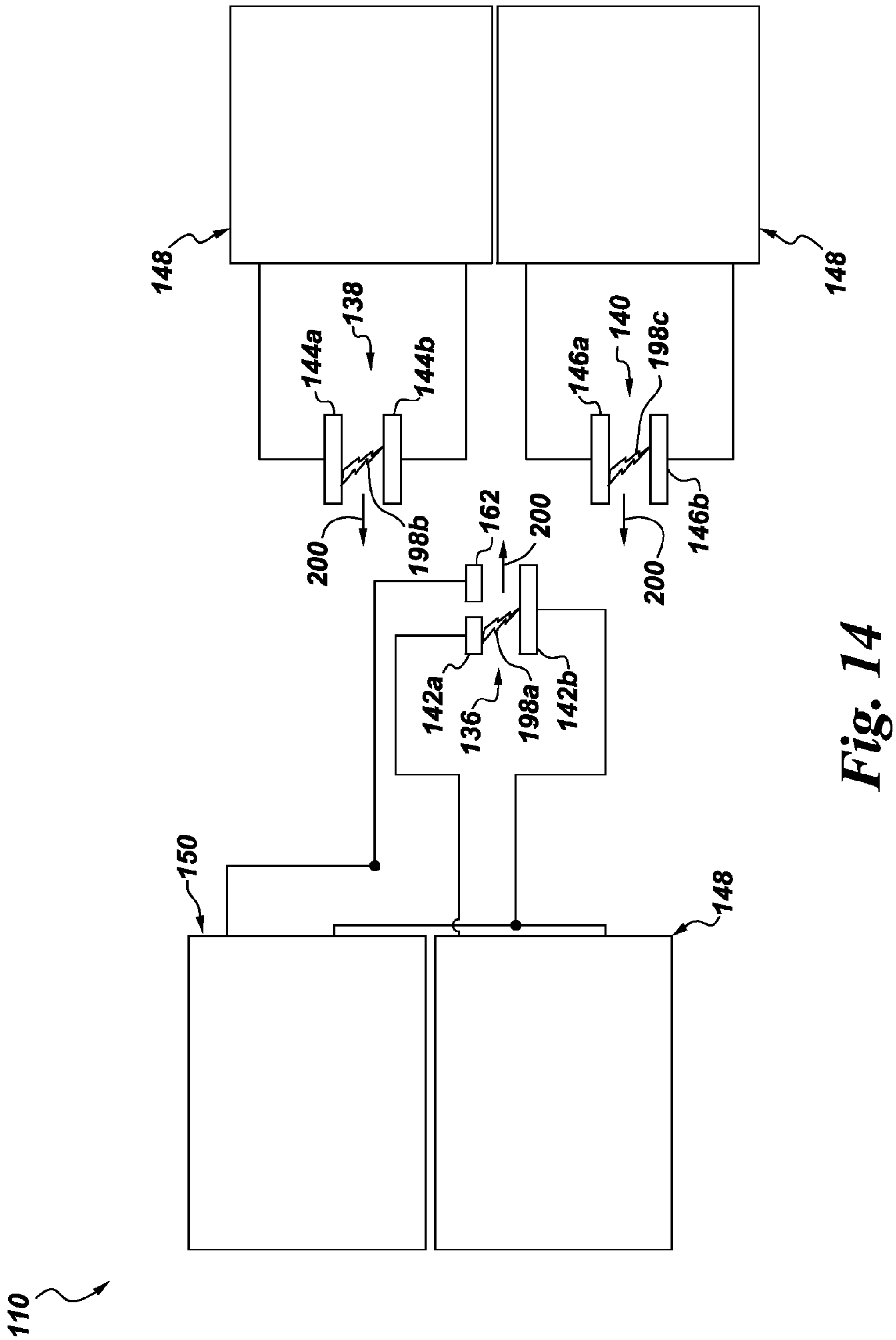
FIG. 14 is a circuit diagram of the plasma generation system of FIG. 2 depicting the formation of arcs between the electrodes of the remaining plasma guns.

Referring to FIGS. 12-14, once the arc **198*a* has been transferred to the second and base electrodes 142*a*, 142*b*, the low voltage, high current pulse energy source 148 is configured to maintain a sufficient arc current so as to cause ablation of the associated ablative material portions 152, which results in the generation of plasma 200 in the chamber 154. Some of the plasma 200 generated in the chamber 154 can then be emitted by the port 160 associated with the plasma gun 136. However, at least some of the plasma 200 can be directed by the conduit 194 into the chambers 156, 158 of the other plasma guns 138, 140**.

As plasma 200 enters the chambers 156, 158 of the plasma guns 138, 140, the respective impedances associated with the spaces between the corresponding electrode pairs **144*a* and 144*b*, 146*a* and 146*b* are reduced. The low voltage, high current pulse energy sources 148 respectively connected across the electrodes 144*a* and 144*b*, 146*a* and 146*b* can then initiate an arc 198*b*, 198*c* between each pair of electrodes. The low voltage, high current pulse energy sources 148 are again configured to maintain sufficient arc currents so as to cause ablation of the associated ablative material portions 152, which results in the generation of plasma 200 in the chambers 156, 158**.

Figure 15:
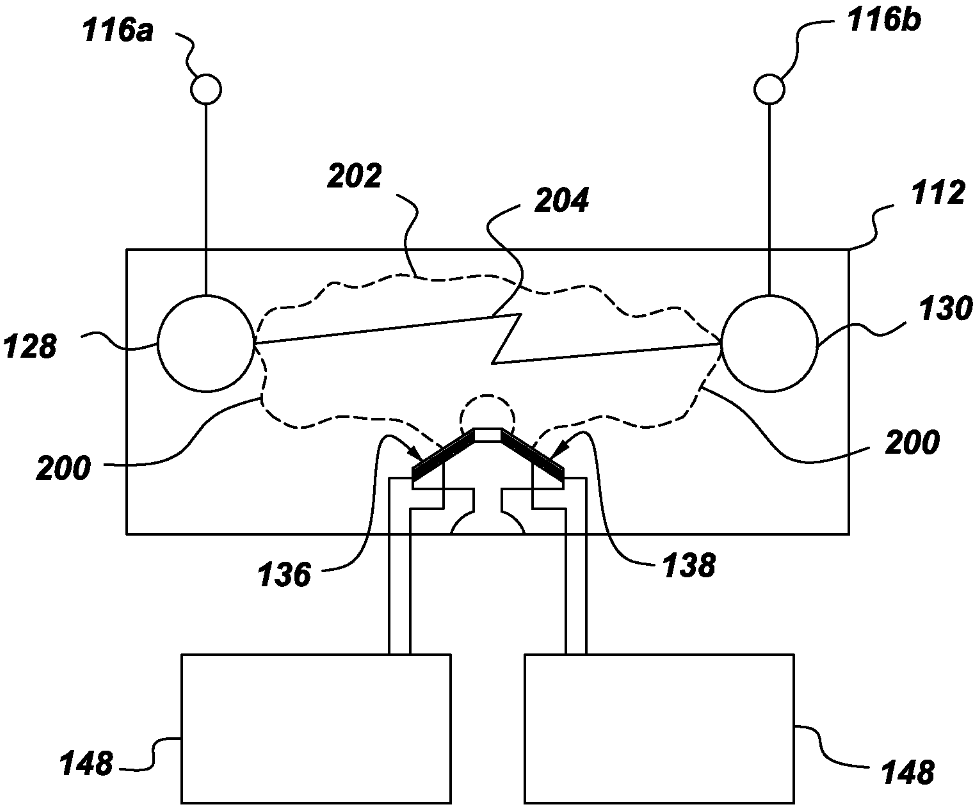
FIG. 15 is a schematic side view depicting the operation of the arc mitigating device of FIG. 2.

Referring to FIGS. 2, 12 and 15, once the plasma guns 136, 138, 140 are generating plasma 200, the plasma can be emitted from the respective ports 160 so as to occupy the space between the main electrodes 128, 130, 132. The plasma 200 can create a conductive plasma bridge 202 between the main electrodes 128, 130, 132, thereby shorting the main electrodes and allowing a protective arc 204 to form therebetween. The plasma bridge 202 may therefore act to mitigate the arc flash event 116, activating a protective device upstream (such as circuit breaker 106) and thereby cutting power supplied to the faulty power system. This deliberately created fault may be carried out in a controlled manner wherein the energy associated with the arc flash event 116 can be diverted away from the fault location. The protective arc 204 can emit a substantial amount of energy in the form of intense light, sound, pressure waves, and shock waves. The protective arc 204 further causes vaporization of the main electrodes 128, 130, 132, resulting in high pressure. It may be noted that the arc mitigating device 110 can include an enclosure or arc containment device 112 configured to contain shock waves and high pressure resulting from the protective arc 204. Examples of arc containment devices are provided in U.S. patent application Ser. No. 12/471,662 filed on May 26, 2009, which is hereby incorporated by reference in its entirety.

Characteristics of the jet of plasma 200 exiting the ports 160, such as velocity, ion concentration, and spread, and also characteristics of the plasma bridge 202, may be controlled by, amongst other things, the dimensions and spacing of the plasma guns 136, 138, 140, the type of ablative material, and the manner in which energy is supplied by the energy sources 148. Thus, the impedance of the gaps between the main electrodes 128, 130, 132 upon activating the arc mitigating device 110 can be designed to produce a relatively fast and robust protective arc 204.

Embodiments configured in accordance with the above examples may enable the activation of multiple plasma guns with a single high voltage, low current energy source connected to a single one of the multiple plasma guns. Such a configuration may have several advantages. For example, high voltage, low current energy sources tend to be expensive, and it is therefore useful to minimize the number of such devices that are required. Further, for embodiments including a single high voltage, low current energy source that acts to trigger multiple plasma guns connected in series, one or more blocking diodes may be required in order to avoid having the high voltage pulse bypass one or more of the downstream guns by flowing through the path formed by the trigger electrode, the positive electrode of an upstream gun, and the high-current capacitor. This diode would make the trigger system more complex and costly, and, further, above certain current level (5 kA), may tend to limit the high current pulse due to its high resistance when conducting.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. An apparatus comprising:
- a first plasma generation device comprising:
  - a first electrode;
  - a base electrode that is spaced apart from said first electrode;
  - a second electrode that opposes and is spaced apart from said base electrode;
  - a high voltage, low current energy source configured to generate a potential difference between said first electrode and said base electrode sufficient to cause an arc therebetween, wherein said arc between said first electrode and said base electrode is configured to reduce an impedance of an area between said second electrode and said base electrode; and
  - a low voltage, high current energy source connected between said second electrode and said base electrode and configured to cause a breakdown of air between said second electrode and said base electrode when said impedance is reduced and transfer said arc between said first electrode and said base electrode to and sustain between said second electrode and said base electrode;
- a second plasma generation device; and
- a conduit configured to direct plasma between said first and second plasma generation devices.

2. The apparatus of claim 1, further comprising a third plasma generation device, wherein said conduit is further configured to direct plasma between said first and third plasma generation devices.

3. The apparatus of claim 1, wherein said first and second plasma generation devices are configured to emit plasma generated therein so as to provide a plasma bridge between main electrodes that are separated by at least about 50 mm.

4. The apparatus of claim 1, further comprising main electrodes that are separated by at least about 50 mm, wherein each of said first and second plasma generation devices is configured to emit plasma generated therein so as to provide a plasma bridge between said main electrodes.

5. The apparatus of claim 1, wherein said second plasma generation device includes
- a pair of opposing and spaced apart electrodes; and
- a low voltage, high current energy source connected between said pair of opposing electrodes.

6. The apparatus of claim 5, wherein said second plasma generation device is configured to receive plasma generated by said first plasma generation device; wherein said plasma is configured to reduce an impedance of an area between said pair of opposing electrodes sufficiently to allow an arc to be established between said pair of opposing electrodes due to said low voltage, high current energy source.

7. The apparatus of claim 5, wherein said second plasma generation device includes an ablative material configured to be ablated when an arc exists between said pair of opposing electrodes.

8. The apparatus of claim 1, wherein said first plasma generation device includes an ablative material configured to be ablated when an arc exists between said second and base electrodes.

9. The apparatus of claim 1, wherein said high voltage, low current energy source is configured to produce a voltage of at least about 8 kV and a current less than or equal to about 1 A.

10. The apparatus of claim 1, wherein said low voltage, high current energy source is configured to produce a voltage less than or equal to about 1 kV and a current of at least about 4 kA.

11. An apparatus comprising:
- a first plasma generation device comprising:
  - a first electrode;
  - a base electrode that is spaced apart from said first electrode;
  - a second electrode that opposes and is spaced apart from said base electrode;
  - a high voltage, low current energy source configured to generate a potential difference between said first electrode and said base electrode sufficient to cause an arc therebetween, wherein said arc between said first electrode and said base electrode is configured to reduce an impedance of an area between said second electrode and said base electrode; and
  - a low voltage, high current energy source connected between said second electrode and said base electrode and configured to cause a breakdown of air between said second electrode and said base electrode when said impedance is reduced and transfer said arc between said first electrode and said base electrode to and sustain between said second electrode and said base electrode;
- a second plasma generation device including
  - a pair of opposing and spaced apart electrodes; and
  - a low voltage, high current energy source connected between said pair of opposing electrodes; and a conduit configured to direct plasma between said first and second plasma generation devices, wherein said second plasma generation device is configured to receive plasma generated by said first plasma generation device; wherein said plasma is configured to reduce an impedance of an area between said pair of opposing electrodes sufficiently to allow an arc to be established between said pair of opposing electrodes due to said low voltage, high current energy source.

12. The apparatus of claim 11, further comprising a third plasma generation device, wherein said conduit is further configured to direct plasma between said first and third plasma generation devices.

13. The apparatus of claim 11, further comprising main electrodes that are separated by at least about 50 mm, wherein each of said first and second plasma generation devices is configured to emit plasma generated therein so as to provide a plasma bridge between said main electrodes.

14. The apparatus of claim 11, wherein said first plasma generation device includes an ablative material configured to be ablated when an arc exists between said second and base electrodes.

* * * * *